Jan. 21, 1969    R. GARABELLO    3,422,834
PLUNGER TYPE ADDITIVE INJECTION DEVICE
Filed Sept. 28, 1966    Sheet _1_ of 4
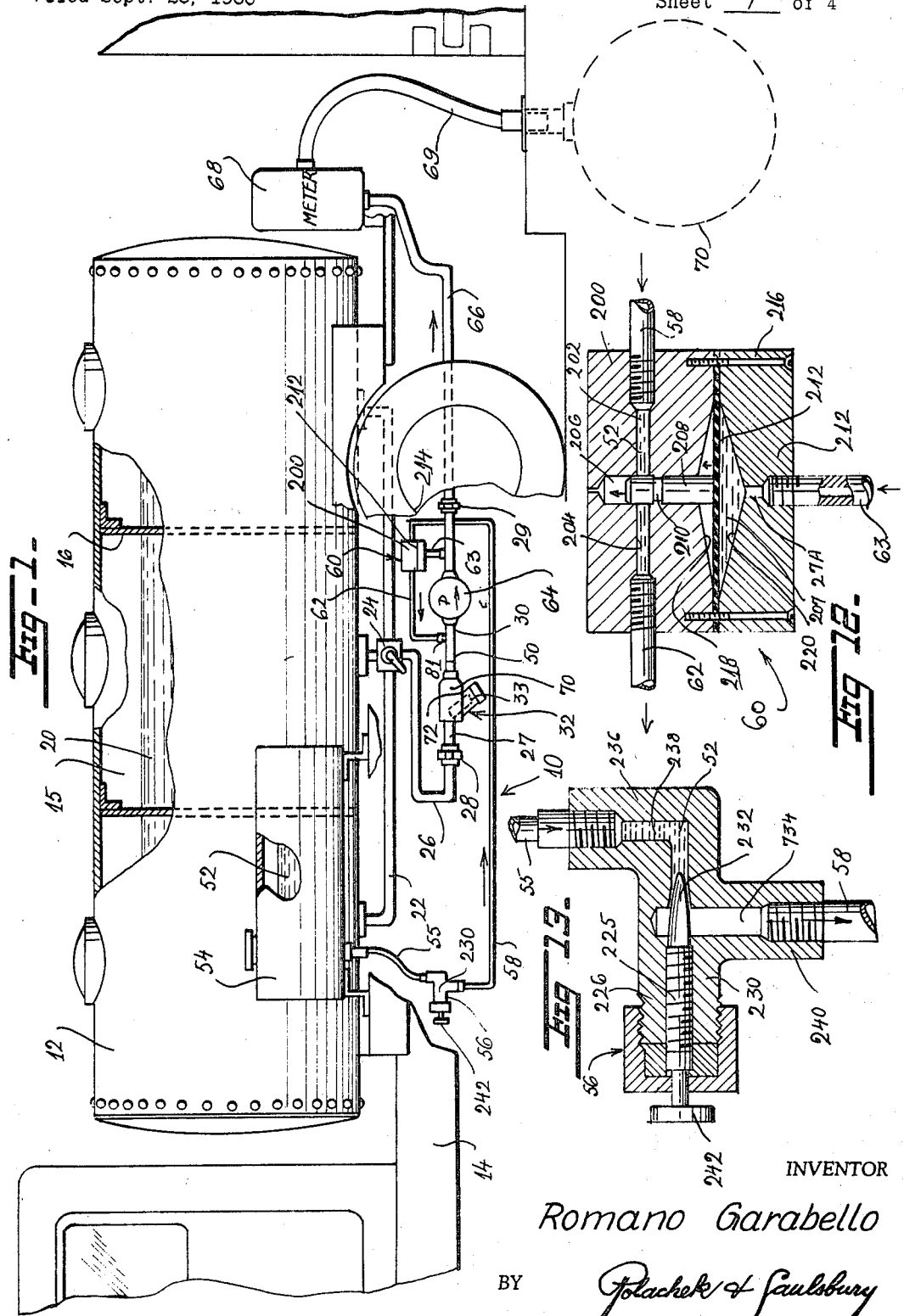
INVENTOR
Romano Garabello
BY Polachek & Saulsbury
ATTORNEYS

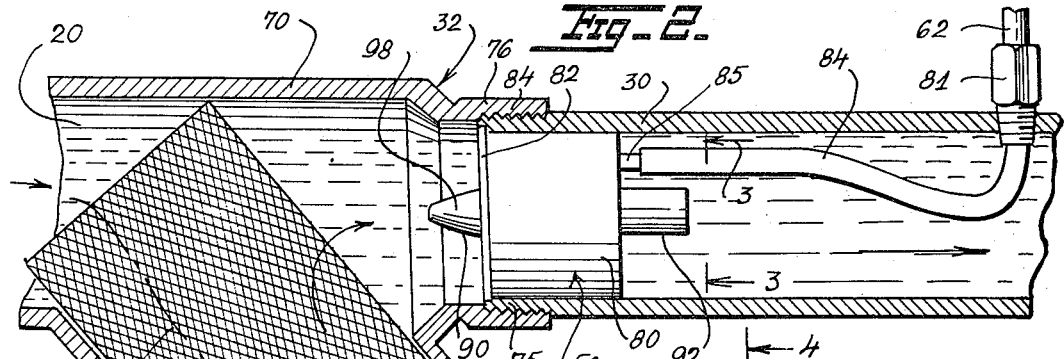

Jan. 21, 1969   R. GARABELLO   3,422,834
PLUNGER TYPE ADDITIVE INJECTION DEVICE
Filed Sept. 28, 1966
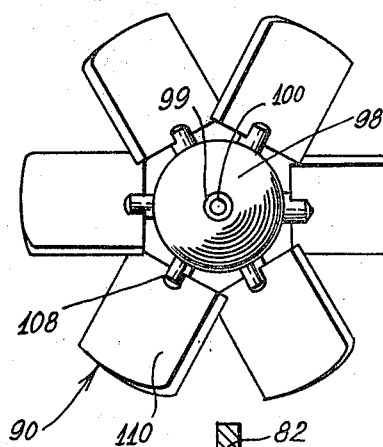
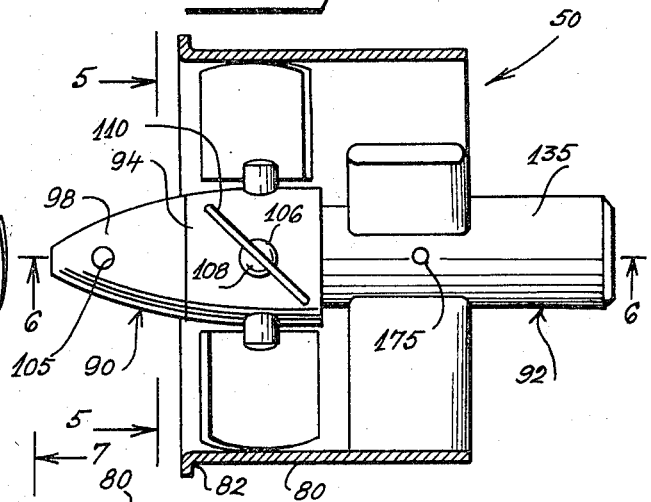
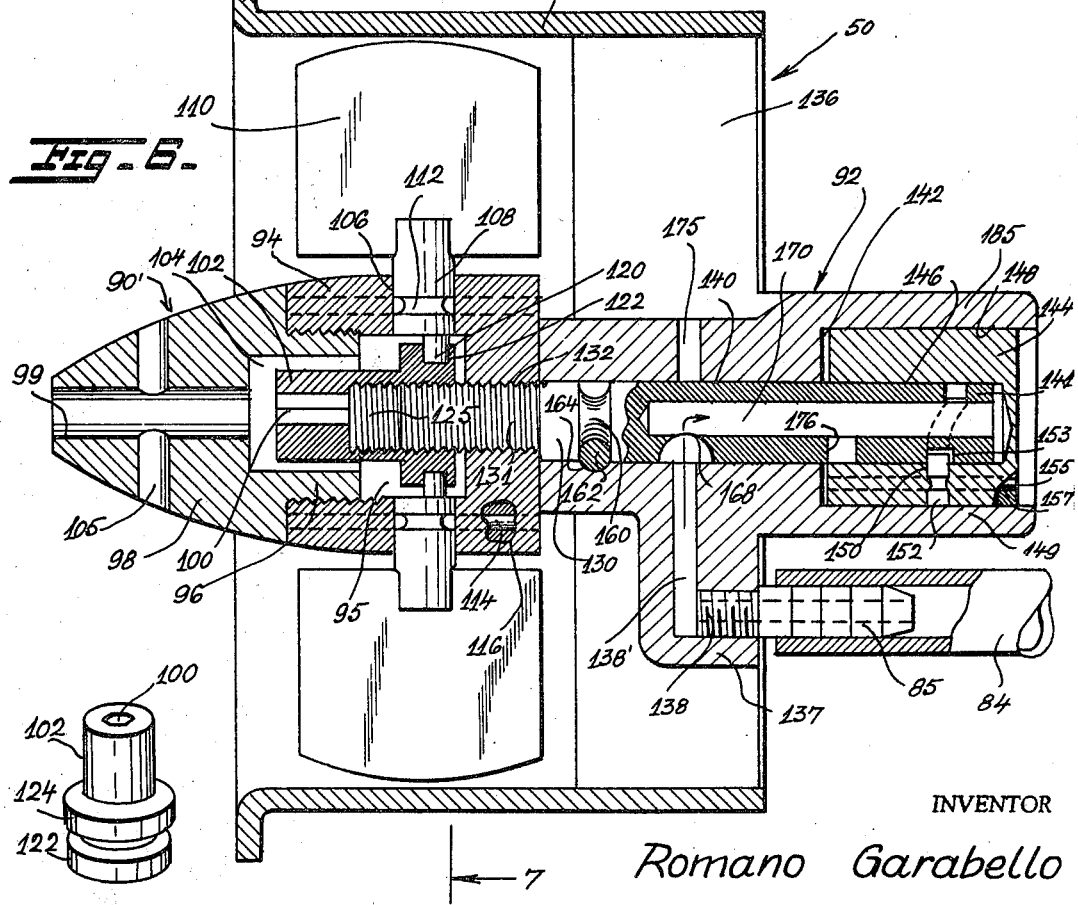
INVENTOR
Romano Garabello

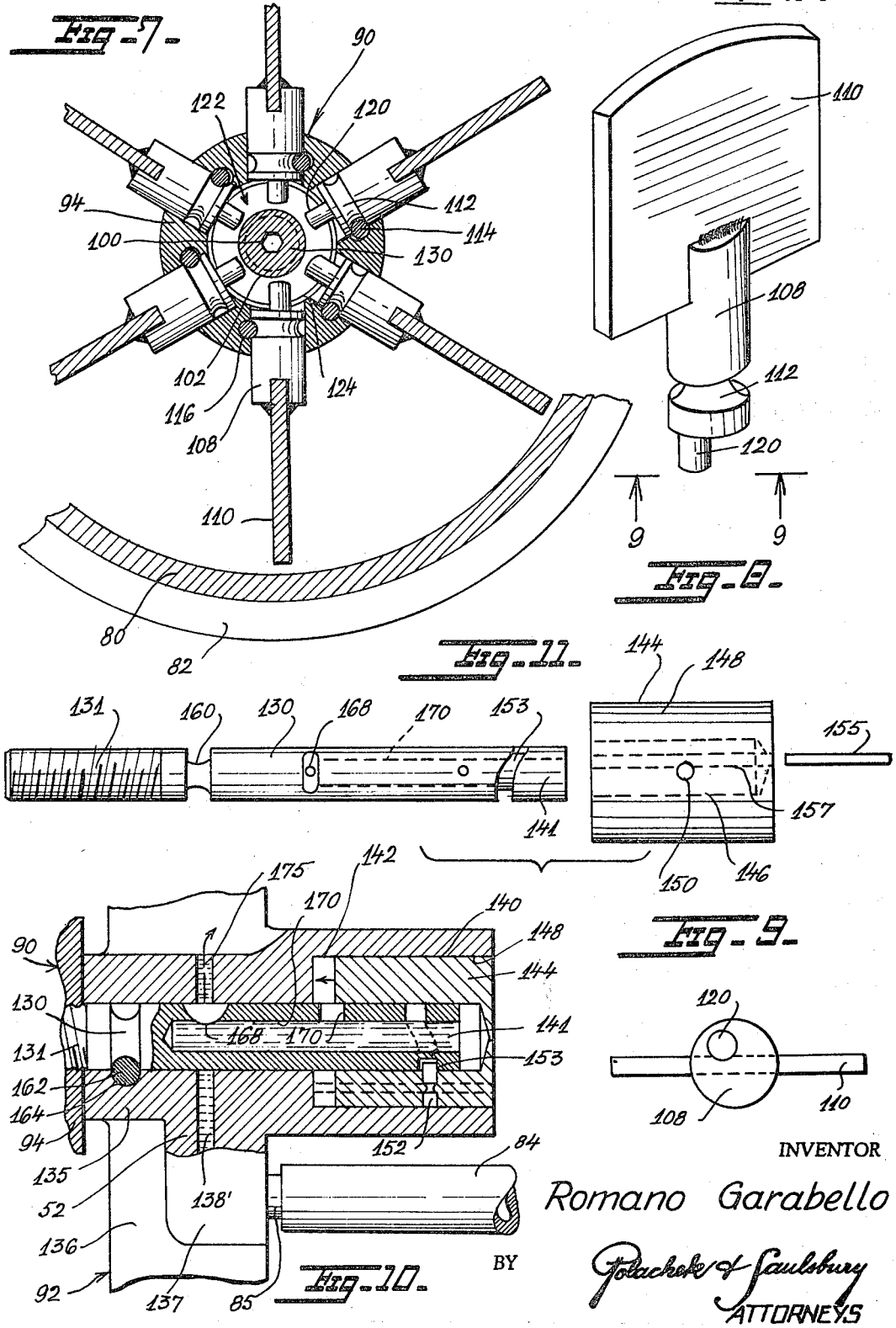

United States Patent Office 3,422,834
Patented Jan. 21, 1969

3,422,834
PLUNGER TYPE ADDITIVE INJECTION DEVICE
Romano Garabello, Brooklyn, N.Y., assignor, by mesne assignments, to Metropolitan Petroleum Petrochemicals Co., Inc., New York, N.Y., a corporation of New York
Filed Sept. 28, 1966, Ser. No. 582,559
U.S. Cl. 137—99                10 Claims
Int. Cl. G05d 11/03

This invention relates generally to fluid distribution systems and more particularly concerns a device for injecting an additive fluid in predetermined proportions into a fluid supply line.

The invention is especially applicable to a system in which fuel oil is pumped from a supply thereof through a main supply conduit to a consumer's oil tank or to a storage tank. It is desired to feed a fluid additive to the oil passing through the conduit, the rate of feed of the additive depending on the rate of flow of the fuel oil in the conduit. The present invention makes this possible.

According to the invention there is provided a device which can be mounted in a main fuel oil supply line or conduit. The device includes a reciprocating pumping element which is actuated in response to the flow of fuel oil in the main supply conduit to discharge the additive fluid in predetermined proportions into the conduit. The pumping element is operated by a rotating shaft driven by a rotor having vanes immersed in the fuel oil in the main supply conduit and driven by the moving fuel oil. Mechanical means may be provided whereby the pitch of the vanes can be adjustably positioned so that the speed of rotation of the shaft can be selectively adjusted with respect to the rate of flow of the fuel oil. The device is a compact, automatically operated unit which requires no particular care or maintenance after installation.

It is therefore a principal object of the invention to provide a device for injecting an additive fluid into a main fluid supply line or conduit.

It is another object to provide a device of the character described with a reciprocating pumping element actuated by a rotating shaft driven by the main stream of fluid in the supply line for injecting the additive fluid in at a variable rate depending on the rate of flow of the main stream.

A further object is to provide a device of the character described wherein the rotating shaft is driven by a multiple vaned rotor.

Still another object is to provide a device as described wherein the vanes of the rotor are adjustably positioned for selectively determining the rate of injection of the additive into the main stream.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view, with parts broken away of a fuel oil distribution system, with a fluid additive injection device embodying the invention installed therein.

FIG. 2 is a longitudinal sectional view on an enlarged scale through a fluid supply conduit of the system of FIG. 1, showing the device in side elevation.

FIG. 3 is an enlarged end elevational view of the device taken on line 3—3 of FIG. 2.

FIG. 4 is a longitudinal sectional view partially in side elevation taken on line 4—4 of FIG. 3.

FIG. 5 is an end elevational view of part of the device showing the rotor.

FIG. 6 is a further enlarged longitudinal sectional view taken on line 6—6 of FIG. 4 showing the rotatable shaft and reciprocatable pumping element in one position.

FIG. 7 is a cross sectional view taken on line 7—7 of FIG. 6, showing details of the rotor with parts of two vanes being broken away.

FIG. 7A is a perspective view of an adjustment nut employed in the rotor.

FIG. 8 is a still further enlarged perspective view of a single vane of the rotor.

FIG. 9 is an end view of the vane taken on line 9—9 of FIG. 8.

FIG. 10 is a sectional view similar to a part of FIG. 6, showing the shaft and pumping element in another position.

FIG. 11 is an exploded plan view of the rotatable shaft and pumping element.

FIG. 12 is an enlarged sectional view of a fluid control valve employed in the system of FIG. 1.

FIG. 13 is an enlarged sectional view of a flow control valve employed in the system of FIG. 1.

FIG. 14 is a view similar to FIG. 5 showing another rotor construction.

FIG. 15 is a side view of the rotor of FIG. 14.

FIG. 16 is an exploded perspective view of parts of the rotor of FIG. 15.

The system 10 shown in FIG. 1 includes a fuel oil supply tank 12 carried by a trailer truck 14 and having compartments 15 defined by partitions 16. The compartments contain fuel oil 20. The fuel oil is discharged via a manifold 22 and distributor valve 24 into a main fuel oil supply line or conduit 26. In this line, connected by couplings 28, 29 are two line or conduit sections 27 and 30. Between sections 27 and 30 is an assembly 32 shown to better advantage in FIG. 2 and including fuel oil filter 33 and additive injection device 50. The fluid additive 52 is contained in an auxiliary supply tank 54 which has an outlet line 55 connected to a valve 56. Additive supply line 58 is connected to valve 56 and terminates at the inlet of a flow control device 60. The outlet line 62 of device 60 is connected to conduit section 30 where it is connected to device 50 as better shown in FIG. 2. The device 60 has a lateral branch pipe 63 connected to line section 30 so that device 60 is responsive to the pressure of fuel oil flowing in the line. Device 60 is described further below in connection with FIG. 12. The valve 56 is described further below in connection with FIG. 13. A pump 64 is provided in section 30 to drive fuel oil mixed with additive 52 through supply line 66 to a metering device 68 from which the fuel oil mixture flows through discharge pipe 69 temporarily connected to a consumer's storage tank 70, shown in dotted lines in FIG. 1. To the extent described, the system is the invention of Sidney J. Reiser and forms the subject of a co-pending patent application filed by him. The present invention is directed at the assembly 32 including device 50 which will now be described in detail in connection with FIGS. 2–16.

Referring now to FIGS. 1 and 2, assembly 32 includes a cylindrical casing 70 into which fuel oil 20 enters from line section 27. Casing 70 has a laterally and angularly extending branch 72 in which is cylindrical screen filter or strainer 33. Removable cap 73 closes branch 72. The filter extends into and across the casing 70 so that the fuel oil 20 traverses path P through the filter and enters fuel line section 30 in which device 50 is installed. Line section 30 has an externally threaded end portion 75 engaged with an internally threaded flange 76 at the outlet end of casing 70. Device 50 has an external tubular ring 80 force fitted in the cylindrical line section 30. The ring 80 has an annular flange 82 seated in a groove 84 formed in line section 30. Ring 80 is axially aligned with the axis of line section 30. Additive line 62 is connected to fitting 81 which is secured to line section 30. A connecting pipe 84 connects fitting 81 and line 62 to inlet fitting 85 of device 50. Device 50 has a rotor 90 and stator 92 best shown in FIGS. 3 to 11 to which reference is now made.

The rotor 90 has a tubular, tapered body 94 formed with an internal cavity 95. The wall of the cavity is threaded and removably engages threaded nipple 96 of a tapered nut 98. The nut has a central bore 99 through which a hexagonal wrench can be inserted for engagement in hexagonal hole 100 of an adjustment nut 102. The head of the nut is located in recess 104 of nut 98; see FIG. 6. Lateral holes 105 in nut 98 can be engaged by a spanner wrench for removing and replacing nut 98 on body 94.

In body 94 is a plurality of radial circumferentially spaced bores 106 opening into cavity 95. Generally cylindrical shanks 108 of vanes 110 fit rotatably in bores 106. Each shank has a circumferential groove 112 engaged by a different one of pins 114 inserted axially of body 94 in bores 116. Short keys 120 extend inwardly of cavity 95 from the ends of shanks 108. Each key 120 is eccentrically located at the end of a shank 108 as clearly shown in FIGS. 8 and 9. The keys are engaged in a circumferential groove 122 formed in the cylindrical body 124 of nut 102; see FIGS. 6, 7 and 7A. Nut 102 has an internally threaded bore 125 and is engaged on one end of rotatable shaft 130. The shaft 130 is screwed into threaded bore 132 of body 94 and is locked securely to this body so that the shaft and body rotate together with nut 98 as a unit. The nut 102 can be axially advanced or retracted on the threaded end 131 of shaft 130. This advances or retracts all keys 120 simultaneously axially of the rotor 90. Movement of the keys causes the shanks 108 to rotate simultaneously so that the flat vanes 110 all turn.

Vanes 110 extend radially of the rotor inside of ring 80 and are disposed so that their planes are angularly disposed to the axis of the rotor and ring. Thus when the fuel oil 20 flows through the casing section 30 and ring 80 the rotor is caused to turn circumferentially inside the ring.

Stator 92 supports the rotor. This stator has a generally cylindrical body 135 integrally formed with three radial spider arms 136 secured inside of ring 80; see FIGS. 3 and 6. A radially extending projection 137 is formed on body 135. In this projection is a threaded bore 138 in which is secured fitting 85. Pipe 84 is connected to this fitting as mentioned above. Bore 138 has a portion 138′ which extends radially of body 135 and opens into a cylindrical bore 140 and terminates at its other end 141 in an enlarged pumping chamber 142 formed at the outer end of body 135. A pumping element 144 is disposed in chamber 142. This element is a cup shaped member having an axial blind bore 146. The shaft 130 is freely rotatable inside of bore 146. Inside bore 146 the shaft end 141 is smoothly fitted. The outer cylindrical wall 148 of element 144 forms a rather tight slidable friction fit with the wall 149 of chamber 142. Thus element 144 is slidable axially inside of chamber 142 of the stator 92 but will not rotate with shaft 130.

Element 144 has a lateral hole 150 in which is a pin 152. The pin extends inwardly of the element and is located in a generally elliptical circumferential camming slot or groove 153 formed externally on shaft end 141. Pin 155 in bore 157 holds pin 152 in element 144. It will thus be apparent that when the shaft 130 rotates, the element 144 which is frictionally gripped by the wall of chamber 142 will reciprocate axially without turning. If desired element 144 and wall 149 can be noncircular in cross section to prevent turning of element 144 in chamber 142.

A circumferential groove 160 is formed in shaft 130. A pin 162 seated in a bore 164 in body 135 engages in groove 160 and holds the shaft rotationally in body 135 while preventing it from axial movement. A lateral circumferentially extended hole 168 is formed in shaft 130. This hole communicates with a bore 170 in the shaft. Body 135 has a radially extending port or hole 175 axially aligned with the inlet passage terminating in bore 138′. Port 175 is aligned with hole 168 so that in one position of the shaft as shown in FIG. 6, bore 138′ opens into bore 170 through hole 168. In another rotational position of the shaft shown in FIG. 10, bore 170 communicates with port 175 via hole 168. A radially extending hole 176 in shaft end 141 provides continuous communication between bore 170 and pumping chamber 142.

During operation of the device 50, the fuel oil 20 flowing through line section 30 will turn the vanes 110 so that rotor 90 rotates continuously. When shaft hole 168 is open to passage inlet 138, 138′ as shown in FIG. 6, additive fluid 52 will enter bore 170 and will fill chamber 142 through hole 176 while pumping element 144 is pushed outwardly to the right to its outward limit shown in FIG. 10. This outward movement is caused by the engagement of cam follower pin 152 in rotating camming groove 153. After chamber 142 is filled, the circumferentially extended hole 168 comes around to hole 175 in body 135. The additive fluid 52 discharges then into the stream of fuel oil surrounding the body 135. The fluid discharges through hole 175 because the pumping element 144 is pulled inwardly to the left from the position shown in FIG. 10 to the position shown in FIG. 6. As the element 144 moves to the left or inwardly of body 135 chamber 142 is reduced in size and fluid 52 passes through hole 176 into bore 170 and then through hole 168 to hole 175. By this arrangement the additive fluid passes in spurts into the main body of fuel oil. The rate of additive fluid ejection depends on the speed of rotation of the rotor 90. This speed depends on the speed of flow of the fuel oil and on the pitch of the vanes 110 as set by nut 102.

The flow control device 60 shown in FIG. 1 and FIG. 12 serves to open and close automatically the passage of additive fluid injection device 50. Device 60 has a body block 200 in which are aligned inlet bore 202 and outlet bore 204. Supply line 58 is connected to bore 202 and outlet line 62 is connected to bore 204. In block 200 is a vertical cylindrical chamber 206 in which is slidably fitted a cylindrical piston 208. The piston has a circumferential groove 210 which provides communication between bores 202 and 204 when the piston is elevated. The piston rests on a diaphragm 212 supported between block 200 and a closure plate 214. Bolts 216 hold plate 214 to block 200 with the diaphragm therebetween. Chambers 218 and 220 are defined in the block and plate respectively above and below the diaphragm. Branch pipe 63 is connected to vertical bore 222 in plate 214 and opens into chamber 220. Fuel oil 20 under pressure enters chamber 220 when pump 64 is operating to pump fuel oil through line 66. Branch pipe 63 is located between the pump and line 66 as shown in FIG. 1. Thus when the oil 20 under pressure in chamber 220 elevates the diaphragm and piston, the piston rises and opens the normally closed passage between bores 202 and 204. When the flow of fuel oil 20 stops, the pressure in chamber 220 falls and the piston descends to close off inlet bore 202 from outlet bore 204. By this means the fluid injection device 50 is supplied with additive fluid 52 only while the pumping pressure of main stream 20 is sufficient to open the passage through flow control device 60.

Valve 56 shown in FIGS. 1 and 15 has a manually adjustable threaded shaft 225 seated in a threaded bore 226 in body 230 of the valve. The shaft has a tapered plug 232 on its inner end extending across vertical outlet bore 234. The body 230 has an arm 236 in which is inlet bore 238 to which pipe 55 is connected. Line 58 is connected to bore 234 in arm 240 of body 230. Shaft 225 has an adjustment knob 242. It will be apparent that by adjusting the valve shaft 225 very fine control of the rate of flow of additive fluid 52 can be effected. This adjustment can be made to supplement the adjustment of rotor speed 90 accomplished by adjusting nut 102 in the rotor 90. Nut 102 will provide a relatively coarser adjustment of rotor speed with respect to the speed of fuel oil flow when the pitch of vanes 110 is varied. Valve 56 will enable fined adjustments to be made.

If it is determined that a particular pitch of vanes 110 is optimum, it is possible to replace the rotor 90 in device 50 with one of simpler construction shown in FIGS. 14–16. Here the rotor 90' has a generally cylindrical body 250 with tapered forward end 252. In the cylindrical rear body portion 254 are arcuate slots 255 circumferentially spaced around the body 250 and extending at a predetermined angle to the axis of the body. Curved vanes 110' fit into these slots. The vanes have holes 256 at their ends in which engage anchor pins 258 extending through longitudinal holes 260 formed in body 250. Body 250 has a threaded bore 132' which receives the threaded end 131 of shaft 130 in a manner similar to that shown in FIG. 6. When the rotor 90' is employed in the fluid additive injection device, fine adjustments of the speed of rotation of the rotor with respect to the speed of rate of flow of the fuel oil 20, will be made by adjusting valve 56. In any case, the pumping of the additive fluid will be the same as described in connection with device 50 as shown in FIGS. 3–10.

There has thus been provided according to the invention, an additive fluid injection device which includes a reciprocating pumping element driven by a rotor which is rotated by the main stream of fluid. It will be understood that the device can be used in other fluid distribution systems than the particular fuel oil delivery system described.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A device for injecting an additive fluid into a stream of main fluid flowing in a conduit, comprising a stator having a generally cylindrical body, means for supporting said stator in a stationary position inside and axially of said conduit so that said stream of main fluid passes by and around said body, said body having an axial first bore, a shaft rotatably supported in said bore in said body and extending axially therethrough, means preventing axial movement of the shaft, a rotor having multiple radially extending vanes pitched at an angle to the axis of said body, said rotor being rotatably supported at and by one end of said shaft outside said body so that the main fluid flowing in said conduit turns the rotor, pumping means in said body, said body having a passage providing an inlet for said additive fluid communicating with said pumping means, said body having an outlet port communicating with said pumping means for passing said additive fluid out of said body into said stream of main fluid, and mechanical means operatively engaging said shaft and pumping means so that said additive fluid is discharged from said body into said stream of main fluid when the shaft rotates.

2. A device as recited in claim 1, furhter comprising a ring securable in said conduit in axial alignment therewith, a first named means for supporting said stator comprising spider arms interconnecting said body and said ring.

3. A device as recited in claim 1, wherein said rotor comprises a generally cylindrical other body having a plurality of circumferentially spaced bores, said vanes having cylindrical shanks rotatably disposed in said spaced bores respectively, a pin extending outwardly of one end of each shank and disposed eccentrically of the shank, a nut rotatably engaged on said one end of the shaft for advancing and retracting the nut, said nut having a circumferential groove, each of the pins being engaged in said groove so that rotation of said nut turns all the vanes on said shanks to change the pitch of all the vanes simultaneously.

4. A device as recited in claim 3, wherein said rotor has a tapered other nut removably engaged on said other body, said other nut having a central hole providing access to the first named nut for turning the same to adjust the pitch of the vanes.

5. A device as recited in claim 1, wherein said rotor comprising a generally cylindrical other body, and means rotatably and adjustably supporting said vanes on said other body so that the pitch of the vanes is selectively adjustable.

6. A device as recited in claim 1, wherein said pumping means comprises a cylindrical pumping chamber in said body open to said bore to receive additive fluid, and a reciprocatable axially slidable generally cylindrical pumping element in said chamber engaged with said shaft so that the pumping element reciprocates axially while the shaft rotates to receive and discharge additive fluid.

7. A device as recited in claim 1, wherein said pumping means comprises a cylindrical pumping chamber in said body open to said bore, said shaft having an axial other bore, said shaft having a first radial hole providing constant communication between said chamber and said other bore, said shaft having a second radial hole providing communication alternately with said passage and said port while the shaft rotates, whereby additive fluid entering said body through said passage is discharged from said port after passing through said other bore while said pumping element forces additive fluid out of said chamber into said other bore.

8. A device as recited in claim 1, wherein said mechanical means operatively engaging the shaft and pumping means comprises a generally eliptical camming groove formed on the exterior of the shaft, and a pin extending radially from said pumping element and engaged in said camming groove, so that rotation of the shaft causes said pumping element to reciprocate axially, said pumping element being nonrotatably engaged with said chamber to prevent rotation of the pumping element with said shaft.

9. A device as recited in claim 7, wherein said mechanical means operatively engaging the shaft and pumping means comprises a generally elliptical camming groove formed on the exterior of the shaft, and a pin extending radially from said pumping element and engaged in said camming groove, so that rotation of the shaft causes said pumping element to reciprocate axially, said pumping element being nonrotatably engaged with said chamber to prevent rotation of the pumping element with said shaft.

10. A device as recited in claim 9, wherein said rotor comprises a generally cylindrical other body having a plurality of circumferentially spaced bores, said vanes having cylindrical shanks rotatably disposed in said spaced bores respectively, a pin extending outwardly of one end of each shank and disposed eccentrically of the shank, a nut rotatably engaged on said one end of the shaft for advancing and retracting the nut, said nut having a circumferential groove, each of the pins being engaged in said groove so that rotation of said nut turns all the vanes on said shanks to change the pitch of all the vanes simultaneously.

References Cited

UNITED STATES PATENTS

| 2,748,076 | 5/1956 | Bohannon | 137—99.5 |
| 2,935,078 | 5/1960 | Greenland et al. | 137—99 |
| 2,949,124 | 8/1960 | Eidson et al. | 137—99 |
| 3,054,417 | 9/1962 | Corvisier | 137—99 |

LEONARD D. CHRISTIAN, Primary Examiner.

U.S. Cl. X.R.

137—114

Disclaimer 3,422,834.—*Romano Garabello*, Brooklyn, N.Y. PLUNGER TYPE ADDITIVE INJECTION DEVICE. Patent dated Jan. 21, 1969. Disclaimer filed Feb. 9, 1972, by the assignee, *Metropolitan Petroleum Petrochemicals Co., Inc.*

Hereby enters this disclaimer to claims 1, 2, 3, 4 and 5 of said patent.

[*Official Gazette August 1, 1972.*]